E. R. JOSSELYN.
WHEEL.
APPLICATION FILED FEB. 13, 1913.
1,086,370.
Patented Feb. 10, 1914.
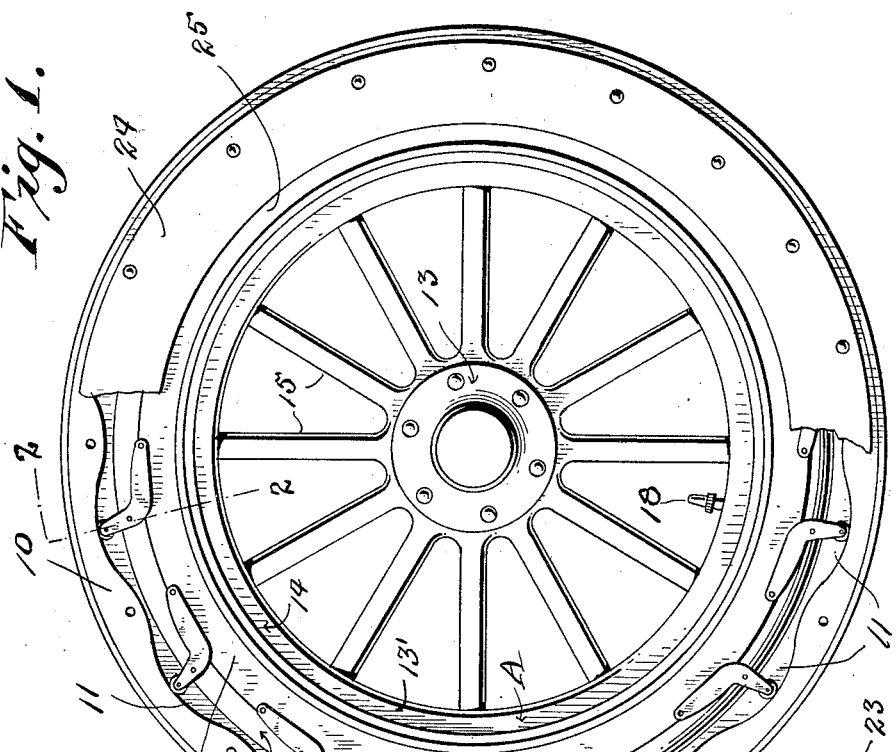
Witnesses
Inventor
E. R. Josselyn
By
Attorneys

UNITED STATES PATENT OFFICE.

ELWYN R. JOSSELYN, OF SAN MARTIN, CALIFORNIA.

WHEEL.

1,086,370.    Specification of Letters Patent.    Patented Feb. 10, 1914.

Application filed February 13, 1913. Serial No. 748,146.

*To all whom it may concern:*

Be it known that I, ELWYN R. JOSSELYN, a citizen of the United States, residing at San Martin, in the county of Santa Clara, State of California, have invented certain new and useful Improvements in Wheels; and I do hereby declare the following to be a full, clear, and exact description of the invention, such as will enable others skilled in the art to which it appertains to make and use the same.

This invention relates to wheels and particularly to those of the resilient type adapted for use with automobiles and motorcycles.

The object of the invention resides in the provision of a wheel of the type named in which an inflated cushion is located between the hub and the rim to provide the required resiliency and at the same time overcome the objectionable feature of tire puncture.

A further object of the invention resides in the provision of a wheel of the type named which will be simple in construction, efficient in use, and which may be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a wheel constructed in accordance with the invention and with a portion of the near cover plate removed; Fig. 2, a section on the line 2—2 of Fig. 1; Fig. 3, a fragmental section showing the position of certain parts during the initial rotation of the wheel, and Fig. 4, a detail perspective view of the element interposed between the cushion and the outer rim which is pivotally connected to the hub section of the wheel.

Referring to the drawings 10 indicates the felly of the wheel which may be of any suitable material and having the inner face thereof provided with a plurality of corresponding arcuate portions 11 for a purpose that will presently appear. Disposed within the felly 10 is an inner member A which includes a hub section 13, and a rim 14. The rim 14 comprises separable sections 13′ and 14′ and spokes 15 connect the hub section and the section 13′ of the rim. The periphery of the section 14′ is grooved as at 16 and seated in this groove 16 is a pneumatic cushion 17 provided with a valve 18 which projects through the sections 13′ and 14′. Pivotally connected to opposite sides of the section 14′ are arms 19 and 20 respectively the free ends of which are connected by a bar 21 upon which is rotatably mounted a roller 22. The arms 19 and 20 are connected inwardly of the bar 21 by a bridge 23 which when the free ends of the arms 19 and 20 are swung toward the section 14′ engages the pneumatic cushion 17. The number of pairs of arms 19 and 20 secured to the rim member 14′ is equivalent to the number of arcuate portions 11 and the roller 22 carried by each pair of arms 19 and 20 engages a respective arcuate portion 11 during the use of the wheel. Secured against the outer side of the felly 10 is a plate 24 having a central opening 25 so as to not interfere with relative movement between the rim and hub section of the wheel. It will be noted however that the plate 24 is sufficiently extensive to overlie the adjacent side of the section 14′. A similar plate 26 is secured to the inner side of the felly 10 and serves in conjunction with the plate 24 to hold the section 14′ of the wheel against lateral disengagement from the felly 10. Owing to the engagement of the rollers 22 with respective arcuate portions 11 it will be apparent that the felly and inner member can only rotate a short distance relative to each other in either direction. It will also be obvious that as the felly 10 can move relatively to the inner member in a radial direction the arms 19 and 20, rollers 22 and bridges 23 will coöperate with the pneumatic cushion 17 to absorb all jolts and jars during travel and that owing to the protected position of the pneumatic cushion 17 the possibility of puncturing the latter will be obviated.

What I claim is:—

In a vehicle wheel, the combination of a hub section, a pneumatic cushion carried by said hub section, a felly surrounding the hub section and having its inner face provided with a plurality of arcuate portions, a plurality of pairs of arms pivotally connected to opposite sides of the hub section respectively, rollers journaled between the free ends of each pair of arms and engaging respective arcuate portions of the felly, and a bridge connecting each pair of arms adapted to engage the pneumatic cushion when the free ends of said arms are moved toward the hub section.

In testimony whereof, I affix my signature, in the presence of two witnesses.

ELWYN R. JOSSELYN.

Witnesses:
 GEO. S. TOWNSEND,
 M. C. FITZGERALD.